(12) United States Patent
Turner et al.

(10) Patent No.: US 6,215,771 B1
(45) Date of Patent: Apr. 10, 2001

(54) TRAFFIC ROUTING IN A TELECOMMUNICATIONS NETWORK

(75) Inventors: John Turner, Foulmere; George Smith, Norwich; Jason Mann, Hertfordshire, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/930,288

(22) PCT Filed: Mar. 29, 1996

(86) PCT No.: PCT/GB96/00769
§ 371 Date: Jul. 30, 1998
§ 102(e) Date: Jul. 30, 1998

(87) PCT Pub. No.: WO96/31969
PCT Pub. Date: Oct. 10, 1996

(30) Foreign Application Priority Data

Apr. 1, 1995 (GB) .................................... 9506772

(51) Int. Cl.[7] .................................................. H04L 12/00
(52) U.S. Cl. ............................................. 370/235; 370/400
(58) Field of Search ................................... 370/229, 248, 370/254, 255, 351, 400, 235, 236, 238, 252; 709/241, 238

(56) References Cited

U.S. PATENT DOCUMENTS 5,072,379 * 12/1991 Eberhardt ............................ 370/248
5,291,477 * 3/1994 Liew .................................... 370/248
5,598,532 * 1/1997 Liron .............................. 395/200.01

OTHER PUBLICATIONS

Shimamoto, "A Dynamic Routing Control Based on a Genetic Algorithm", International Conference on Neural Networks, vol. 2, 4/93, pp 1123–1128.

Krishnan, "An Approach to Path–Splitting in Multipath Networks", IEEE Conference on Communications, vol. 3, No. 3, 5/23–26/93, pp 1353–1357.

* cited by examiner

*Primary Examiner*—Min Jung
(74) *Attorney, Agent, or Firm*—Lee, Mann, Smith, McWilliams, Sweeney & Ohlson

(57) ABSTRACT

A telecommunications network comprising a plurality of nodes interconnected via communications paths is configured by the determination of a routing plan for the traffic carried by the network. A set of possible paths, e.g. the eight shortest paths between each pair of network nodes is determined, and each path is allocated a digital code characteristic of that path identity. Groups of paths are selected, each group comprising one path from each set, and for each said group being characterised by a bit string comprising the digital codes of the paths comprising that group. These bit strings are then used as starting values or chromosomes in a genetic algorithm search procedure to generate and evaluate new path groups so as to determine an optimum combination or routing plan of paths between the network nodes.

5 Claims, 3 Drawing Sheets

TRAFFIC ROUTING IN A TELECOMMUNICATIONS NETWORK

This invention relates to the routing of telecommunications traffic in a network comprising a plurality of nodes interconnected by paths. In particular, the invention relates to a method of defining a traffic routing plan for such a network and to a method of routing traffic via the routing plan.

BACKGROUND OF THE INVENTION

As telecommunication s networks become more complex and the traffic load increases there is a need to determine the routing of traffic within a network so as to minimise the number of communication channels used, to reduce the risk of being unable to handle traffic and to minimise the total cost to the system operator. At present, traffic routing is determined largely on an empirical basis as a full analysis of a complex network to obtain an analytical solution is an intractable problem. It is thus very difficult if not impossible for an operator to ensure that a network is used with a high degree of efficiency under all traffic conditions. It is also difficult for an operator to provide efficient allocation of new traffic routes on demand.

The object of the present invention is to minimise or to overcome this disadvantage.

SUMMARY OF THE INVENTION

According to the invention there is provided a method of configuring a telecommunications network whereby to determine traffic routing, said network comprising a plurality of nodes interconnected by communications paths, and each said path incorporating one or more communications channels, wherein the method includes determining a set of possible paths between each pair of network nodes, allocating to each path of each said set a digital code characteristic of that path identity, selecting groups of paths each said group comprising one path from each set, providing for each said group a respective bit string comprising the digital codes of the paths comprising that group, and using the bit strings of said groups as starting values or chromosomes in a genetic algorithm search procedure whereby to generate new bit strings corresponding to new path groups, determining for each said new path group a fitness function representative of the effectiveness of that new path group relative to the other path groups, and evaluating the new path groups from their respective fitness functions so as to determine an optimum combination of paths between the network nodes.

In another aspect, the invention provides a method of routing traffic in a telecommunications network comprising a plurality of nodes interconnected by communications paths, each said path incorporating one or more communications channels, wherein the method includes determining a set of possible paths between each pair of network nodes, allocating to each path of each said set a digital code characteristic of that path identity, selecting groups of paths each said group comprising one path from each set, providing for each said group a respective bit string comprising the digital codes of the paths comprising that group, and using the bit strings of said groups as starting values or chromosomes in a genetic algorithm search procedure whereby to generate and evaluate new path groups so as to determine an optimum combination of paths between the network nodes, and routing the traffic via said optimum combination of paths.

The genetic algorithm uses the bit strings representing the paths as chromosomes to generate new combinations of paths which are then evaluated to determine those which represent better solutions to the routing problem. The bit strings of these new paths then form new starting values in an iterative procedure which may be continued either until a solution satisfies predetermined criteria or until a predetermined number of iterative cycles have been completed.

The technique may be employed in the construction of a transmission network manager to provide control of traffic routing. The technique may also be employed in ATM switching applications to provide predictive capacity management for the allocation of virtual channels for voice traffic.

A general description of the genetic algorithm procedure is given by J. H. Holland in 'Adaptation in Natural and Artificial Systems', University of Michigan Press, Ann Arbor, Mich.

BRIEF DESCRIPTION OF THE DRAWINGS

An embodiment of the invention will now be described with reference to the accompanying drawings in which.

DESCRIPTION OF PREFERRED EMBODIMENT

Figure 1:
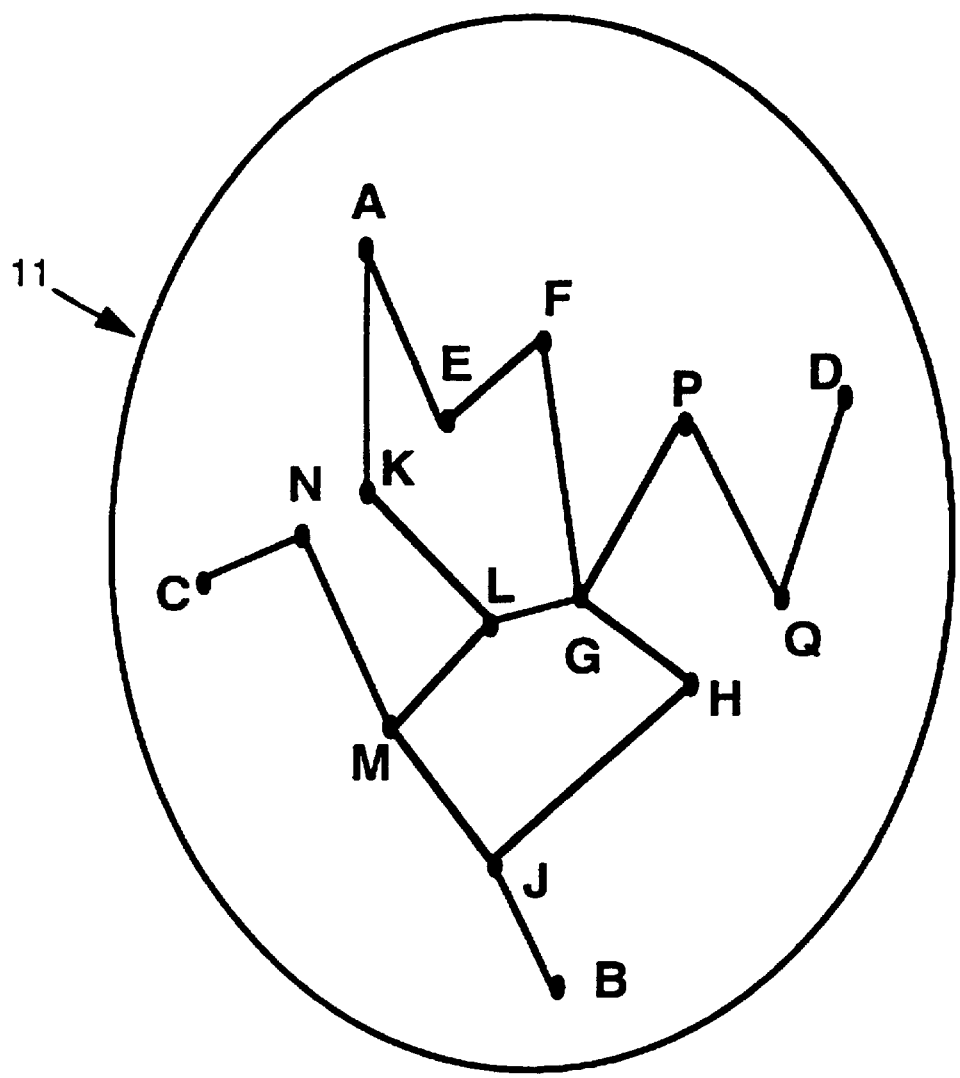
FIG. 1 is a schematic diagram of a typical network illustrating the routing of traffic between nodes.

Referring to FIG. 1, there is depicted a highly schematic diagram of a telecommunications network 11 comprising a number of nodes A to Q, each adjacent pair of nodes in the network being coupled via a corresponding link. Traffic between a pair of nodes, e.g. A and B, is routed over a path which comprises one or more links. For example, traffic between nodes A and B may be routed over a path comprising the links between the nodes K, L, M and J, or over a path via the nodes E, F, G, H and J. In general there will be a large number of possible paths between a pair of nodes. In the network of FIG. 1, each link may conveniently be identified by its end nodes. Thus, the link between the nodes K and L is represented as KL. It will be appreciated that in the network of FIG. 1, there may be some links whose traffic handling capacity is higher than that of other links. In the network of FIG. 1, the nodes may comprise switches or exchanges and the links may comprise trunk groups.

The choice of a particular route between a pair of nodes will in general depend on considerations of the bandwidth required to accommodate the traffic and the cost of the path to the network operator. However, this choice cannot be made in isolation as the traffic route between every other pair of system nodes must also be considered. Thus, in the network of FIG. 1, traffic between nodes C and D may be routed along a path via nodes N. M, L, G, P and Q. However, this particular route uses the link LM which is already used by one of the routes from A to B. If too many routes in the final routing plan for the network also use this particular link there may well be insufficient bandwidth on that link to accommodate the routing plan. It will also be appreciated that in the network of FIG. 1, each individual link will have a designated bandwidth. In the European SDH standard format this bandwidth may be represented in the form 1×63, 4×63 or 16×63, these being the number of virtual containers that are accommodated on a STM1, a STM4 or a STM16 path respectively. Thus, when considering usage of a particular network link, the bandwidth or capacity of that link must be taken into account.

It will be understood that when the routing of traffic between every pair of network nodes is considered, the problem of defining an optimum routing plan becomes extremely complex. A generally preferred solution to be aimed at is one in which every system link is used to 50% of its capacity, although in practice an acceptable solution is one which approaches this preferred solution.

Figure 2:
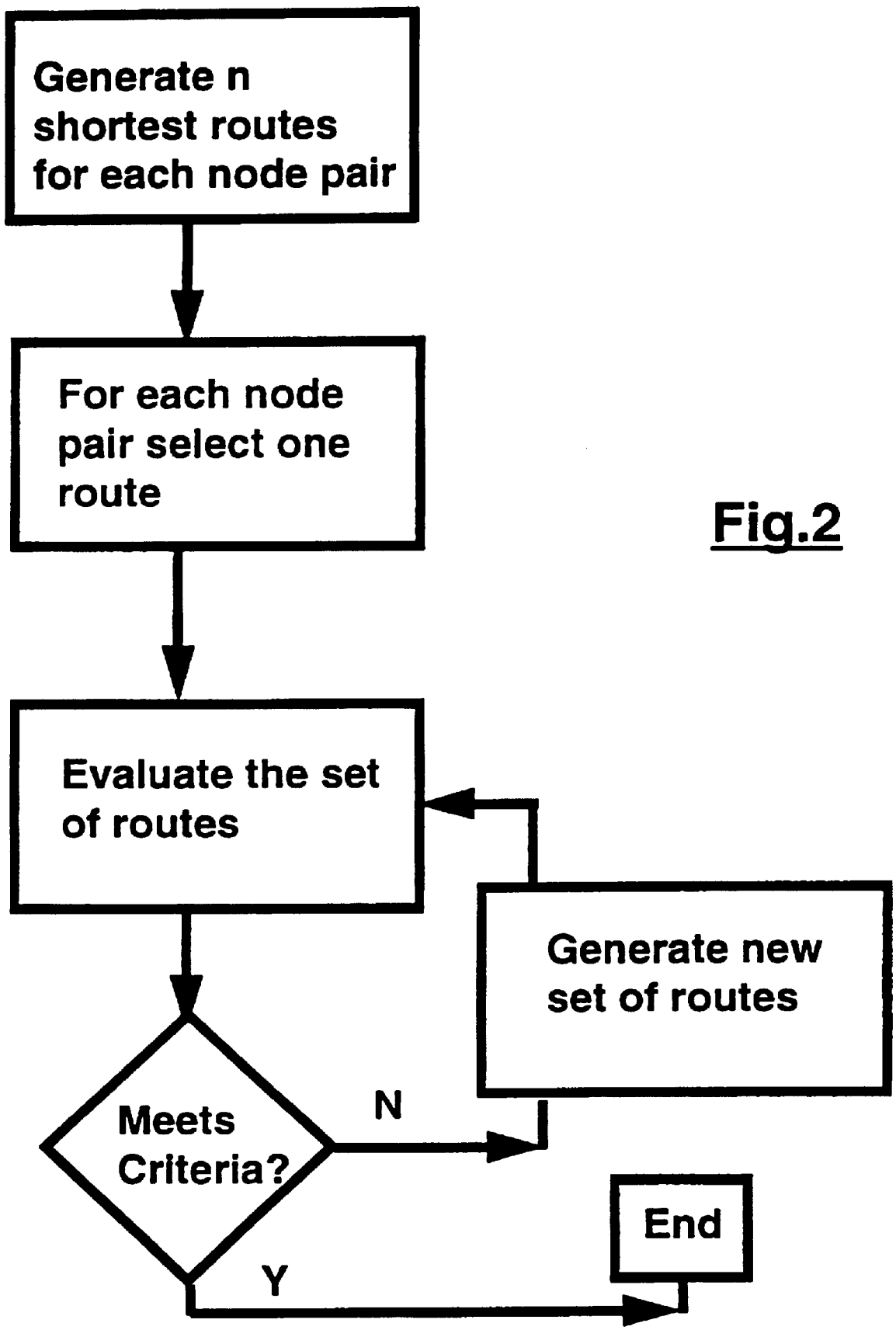
FIG. 2 is a flow chart illustrating the process of evaluating combinations of traffic routes.

Referring now to FIG. 2, this comprises a flow chart illustrating our method of determining an effective routing plan for the telecommunications network of FIG. 1. For every pair of nodes in the network we determine a set of n routes or paths between those nodes. Preferably, these paths comprise the n shortest routes between the two nodes. Conveniently n is a power of 2 and for most applications a set of 8 shortest routes may conveniently be employed. Each of these routes is identified by a three bit binary code which, in the case of 8 routes, will range from 000 to 111. The next step is to form groups of paths, each group comprising paths selected one from each set. Each group is represented as a unique bit string or chain formed from the binary codes of the paths forming the group. Thus for example, the bit string 010100110 . . . represents the group comprising the third path between the first pair of nodes, the fifth path between the second pair of nodes, the seventh path between the third pair of nodes and so on. Although the routes shown in FIG. 2 are point to point, it will be appreciated that the technique may be adapted to address the problem of point to multipoint routing.

The groups of paths thus determined represent each a possible solution to the network routing problem, although some of these possible solutions may of course be infeasible e.g. on the grounds of cost and/or of traffic handling capability. These possible solutions are evaluated to determine a measure of their effectiveness as solutions so that potentially good solutions can be retained and ineffective or poor solutions discarded. This evaluation is made on the basis of a fitness function whose determination will be described below.

The first part of the evaluation process assigns a cost, i.e. a network operator cost, to each bit string in the bit chain representing a path comprising one or more links. This cost is made up of the sum of the costs of the respective network links used by the traffic between the corresponding nodes. These costs, which may be stored in a lookup table, are summed to provide a path cost term (C) in a fitness function for the network.

In addition to the path cost, we also consider the total utilisation of each link in a proposed path group. For each group of paths we construct a utilisation matrix or table which identifies the total traffic demand imposed on every network link by those paths of the group which incorporate that link. I.e. for each path in that group we record a tally of the links used by that path. This tally will of course identify links whose capacity would be overused or underused, and for each potential solution we determine the number (B) of links whose bandwidth capability would either be exceeded or would exceed a predetermined level of usage. This is in effect a congestion factor.

The evaluation process next determines the number of channels and/or the band width that will be required to support the traffic requirements. The amount of traffic on any link determines the number of channels (N) that are required to support that traffic.

We then define a fitness function F for each potential solution as:

$$F = w_1 \times C + w_2 \times N + w_3 \times B$$

Where $w_1$, $w_2$ and $w_3$ are weighting factors which the operator can define to force the process to concentrate on minimising either the path costs or the number of channels used, or to provide a trade off between these constraints. Appropriate values of these weighting factors will be determined by the system operator to match the particular network configuration and traffic requirements. A bias against selection of particular routes can be introduced by adjustment of the corresponding weighting factor $w_3$ so as to reserve these routes for subsequent availability to priority customers or so as to inhibit the routing of traffic on paths whose occupancy is already greater than a predetermined value. The purpose of the genetic algorithm procedure is to generate new solutions or Oath groups whose fitness function is minimised.

Figure 3:
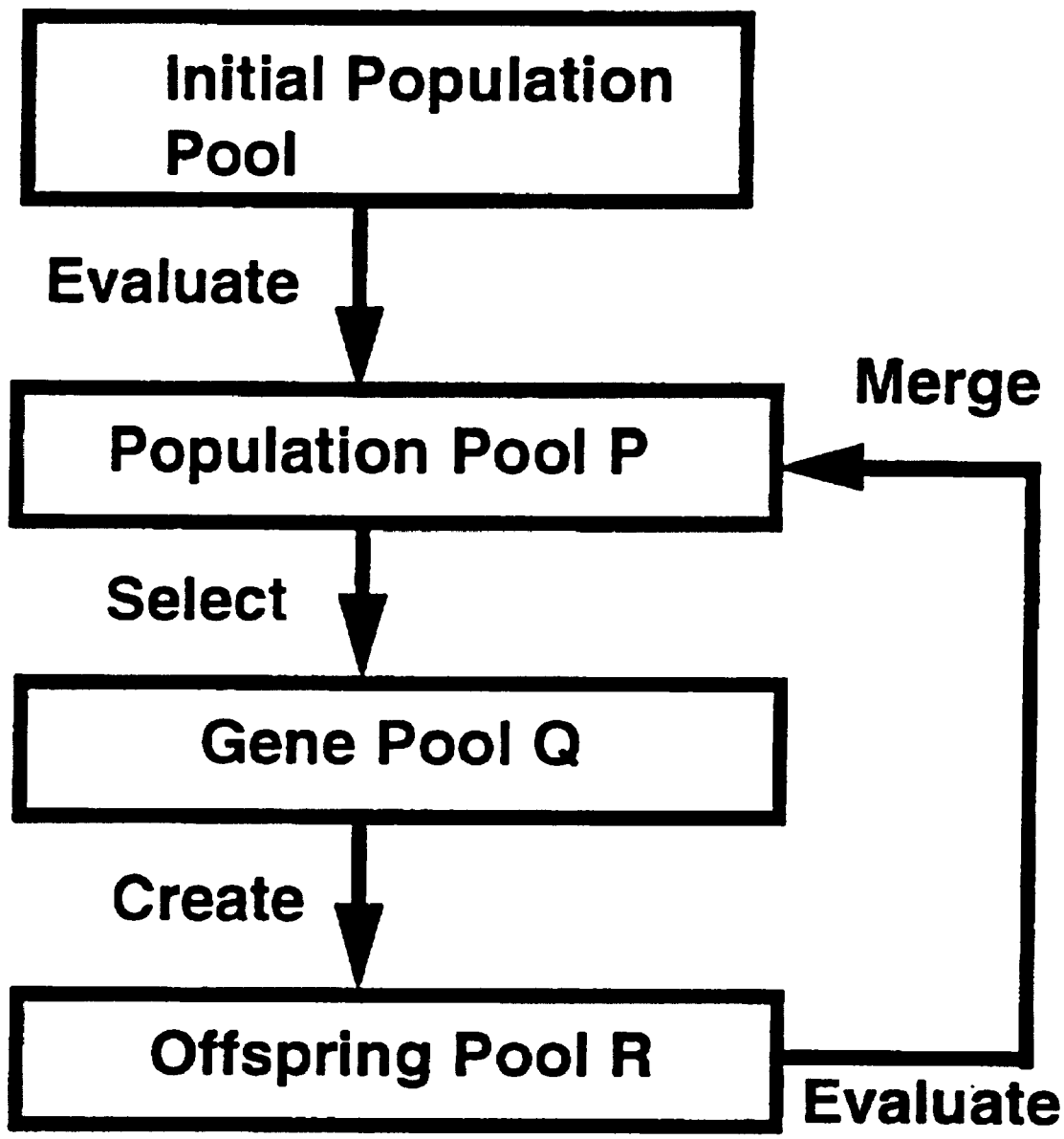
FIG. 3 illustrates the genetic algorithm procedure for determining routing solutions for the network of FIG. 1.

Referring now to FIG. 3, this illustrates the genetic algorithm process for determining routing information from the potential solutions represented by the groups of paths. Each potential solution or path group can be regarded as a chromosome and the component bit codes representing the component paths of the group can be considered as the genes of that chromosome. The paths to be employed as the initial inputs to the genetic algorithm procedure may either be determined on a random basis or a preferred set of paths may be determined from their fitness function as defined above so that the most unfavourable paths are excluded from the initial selection.

The function "select" in FIG. 3 is used to sample the population pool P to generate a gene pool Q, this selection may be done with replacement so that a good solution may be chosen many times. On the other hand, bad solutions may not appear at all in Q. The desired quality in any select mechanism is that good solutions have a better than average chance of being chosen, while bad solutions have a worse than average chance of being chosen. In the described embodiment, this selection is based on the fitness function defined above.

If "select" were the only genetic operator available, then the population could quickly converge to multiple copies of the best solution in the initial population. In order to ensure that the search space is effectively explored, recombination operators are employed with the "create" function of FIG. 3. Typically, we employ crossover and mutation functions described below.

Crossover

In the crossover function, solution strings are chosen at random and, with a predetermined probability $p_c$, identically positioned substrings are exchanged. For example, in a single point crossover, a random crossing point is defined and the portions of the strings to the one side of this point are exchanged. Thus, the strings:

10101∧10011010010 abbba∧abbaabaabbb are recombined to provide the new strings 10101 abbaabaabbb and abbba10011010010

In a similar multipoint crossover process, a number of crossing points are selected and the corresponding bit substreams are interchanged Mutation If we have, for example, an initial population of bit strings in which, for one particular position, the bit value is identical for all members of the population, then all offspring of this population generated by the crossover process will retain this characteristic. This will obstruct exploration of the full search space. To overcome the risk that this situation might occur, we employ a mutation process to introduce random changes at the gene level, i.e. at the bit level. A gene or bit is selected at random with a probability $p_m$, and its value is changed from ONE to ZERO or from ZERO to ONE. This introduces a background mutation into the evolutionary process and ensures that the entire search space is made available. Operation of the genetic algorithm on this mutating population ensures that undesirable mutations die out, but desirable mutations are propagated through the population in subsequent generations.

Other, application specific operators may also be employed to ensure that the search space is as extensive as possible and that the better solutions are retained in the population pool.

The genetic algorithm (FIG. 3) commences with an essentially random population of chromosomes, each chromosome representing a possible solution to the routing problem. Some of these chromosomes are selected by the algorithm on the basis of their fitness function defined above to form a gene pool Q from which a new set or offspring pool R of chromosomes is created using a genetic operator. A new population pool P' is then constructed from the original pool P, the gene pool 0 and the offspring pool R. This process is continued either until a solution is found which satisfies a predetermined criterion determined from the fitness function or until a particular time period has elapsed after which it is expected that little further improvement will result. It will be appreciated that the solution obtained in this manner may or may not be the best possible analytic solution to the routing problem, but it will at worst be a close approximation thereto. In formal terms, the algorithm may be listed as follows:

GA

{objective is to minimise value (p) such that p∈U}

P, Q, R; multiset of solutions ⊂ U;

initialise (P)

while not finish (P) do begin

Q:=select (P);

R:=create (Q);

P:=merge (P,Q,R)

end end GA

In each new iteration, the algorithm manipulates the genes in the gene pool to generate corresponding new path combinations which are then evaluated for fitness. By selecting the better potential solutions this establishes a gene pool containing the more favourable genes. The effects of the crossover and mutation functions can be varied as the algorithm proceeds by suitable adjustment of their respective probability values $p_c$ and $p_m$.

Having determined an appropriate solution to the problem in the form of a binary bit string, this solution is then translated back into the corresponding path routing information for application to the network.

In a development of the technique, the search procedure may be facilitated by "seeding" the population pool of a new search with solutions found from a previous similar search and stored in a memory. We have found that this injection of previously found routing patterns into the initial population employed for a new search can reduce the number of iterations required to converge on an acceptable solution and thus reduce the time required to reach this solution.

In a further application, the technique may be employed as a design tool for the modification or extension of an existing network e.g. to accommodate increased traffic demand. Such modification will generally include the addition of further nodes to the network and/or an increase in the channel capacity of one or more network links.

What is claimed is:

1. A method of configuring a telecommunications network so as to optimise traffic routing within the network and to select optimised traffic routes, said network comprising a plurality of nodes interconnected by communications links, each said link having a predetermined bandwidth capacity and incorporating one or more communications channels, the method comprising the steps of determining for every pair of nodes in the network a set of n possible shortest paths comprising a sequence of links between those nodes where n is a power of 2, assigning to each said shortest path a respective n bit binary code, forming groups of said shortest paths, each said group containing shortest paths one selected from each set and each group being represented as a unique bit string comprising a sequence of the binary codes of its component paths, assigning a cost value to each said shortest path and determining for each said group a cost term comprising the sum of the cost values of its component paths, for each said group of paths, constructing a utilisation table identifying a traffic demand imposed on every network link use by the paths of that group and determining a congestion factor comprising the number of links whose bandwidth capability would be exceeded by a predetermined level of usage, determining for each said group a bandwidth factor comprising the number of communications channels that will be required to support the traffic demand, determining for each said group of paths a fitness function comprising a weighted sum of the cost factor, the congestion factor and the bandwidth factor for that group of paths, assembling a population pool of groups of paths selected according to their respective fitness functions, selecting from the population pool a gene pool of groups of paths of preferred fitness function, generating an offspring pool from said gene pool and population pool via a genetic operator, and repeating said selection and offspring pool generation to determine a network routing solution achieving a predetermined fitness function value, wherein pairs of members of the gene pool are selected at random and, with a first predetermined probability, identically positioned portions of their bit sequences are interchanged, wherein mutations are introduced into the gene pool by introducing random changes in individual bit values with a second predetermined probability, wherein said first and second probabilities are adjusted in value during the route selection process, and wherein said weighting values are adjusted for particular routes so as to render those route less favourable for selection, thereby preserving those routes for availability to priority customers.

2. A method as claimed in claim 1, wherein each said set of paths comprises the shortest routes between the respective nodes.

3. A method as claimed in claim 1, wherein said communications channels are synchronous channels.

4. A method as claimed in claim 1, wherein said communications channels are virtual channels in an ATM network.

5. A method as claimed in claim 1, wherein each said set of paths comprises eight paths.

\* \* \* \* \*